(12) United States Patent
Meier et al.

(10) Patent No.: US 12,136,230 B2
(45) Date of Patent: Nov. 5, 2024

(54) METHOD FOR TRAINING NEURAL NETWORK, SYSTEM FOR TRAINING NEURAL NETWORK, AND NEURAL NETWORK

(71) Applicants: TOYOTA JIDOSHA KABUSHIKI KAISHA, Toyota (JP); The University Court of the University of Edinburgh, South Bridge Edinburgh (GB)

(72) Inventors: Sven Meier, Wilsele (BE); Octave Mariotti, Paris (FR); Hakan Bilen, Edinburgh (GB); Oisin MacAodha, Edinburgh (GB)

(73) Assignees: TOYOTA JIDOSHA KABUSHIKI KAISHA, Toyota (JP); THE UNIVERSITY COURT OF THE UNIVERSITY OF EDINBURGH, South Bridge Endinburgh (GB)

( * ) Notice: Subject to any disclaimer, the term of this patent is extended or adjusted under 35 U.S.C. 154(b) by 396 days.

(21) Appl. No.: 17/717,546

(22) Filed: Apr. 11, 2022

(65) Prior Publication Data
US 2022/0327730 A1    Oct. 13, 2022

(30) Foreign Application Priority Data
Apr. 12, 2021 (EP) .................... 21167942

(51) Int. Cl.
*G06T 7/70* (2017.01)
*G06N 3/045* (2023.01)
*G06T 15/06* (2011.01)

(52) U.S. Cl.
CPC .............. *G06T 7/70* (2017.01); *G06N 3/045* (2023.01); *G06T 15/06* (2013.01);
(Continued)

(58) Field of Classification Search
CPC . G06T 7/70; G06T 15/06; G06T 2207/20081; G06T 2207/20084; G06T 2207/30252; G06N 3/045
See application file for complete search history.

(56) References Cited

U.S. PATENT DOCUMENTS 11,992,702 B2 *  5/2024  Hibbard ................. G16H 50/20
12,020,369 B2 *  6/2024  Bigos .................... G06T 15/506
(Continued)

OTHER PUBLICATIONS

Shubham Tulsiani et al., Multi-view Consistency as Supervisory Signal for Learning Shape and Pose Prediction, 2018 IEEE/CVF Conference on Computer Vision and Pattern Recognition, Jun. 2018, pp. 2897-2905.
(Continued)

*Primary Examiner* — Utpal D Shah
(74) *Attorney, Agent, or Firm* — Dinsmore & Shohl LLP (57) ABSTRACT

A method for training a first neural network to detect the viewpoint of an object visible on an image and belonging to a given category of object when this image is inputted to the first neural network, including: providing a dataset of pairs of images under different viewpoints, providing a second neural network configured to be able to deliver appearance information of an object, providing a third neural network configured to be able to deliver a synthetic image of an object of the category using appearance information and a viewpoint, jointly training the first neural network, the second neural network, and the third neural network.

13 Claims, 3 Drawing Sheets

(52) U.S. Cl.
CPC ............... *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 2019/0259175 A1* | 8/2019 | Inoue | G06N 3/047 |
| 2020/0349380 A1 | 11/2020 | Alakarhu | |
| 2021/0004974 A1* | 1/2021 | Guizilini | G06V 10/82 |
| 2021/0150757 A1* | 5/2021 | Mustikovela | G06V 10/454 |
| 2021/0390723 A1* | 12/2021 | Ye | G06T 7/564 |
| 2022/0044075 A1* | 2/2022 | Tremblay | G06N 3/08 |
| 2022/0284624 A1* | 9/2022 | Nimmagadda | G06T 7/75 |
| 2023/0080133 A1* | 3/2023 | Meier | G06V 10/25 382/103 |

OTHER PUBLICATIONS

Taiki Saruwatari et al., 3D Reconstruction Based on Style Transfer Dara Augmentation, The transactions of the Institute of Electrical Engineers of Japan C, Japan, The Institute of Electrical Engineers of Japan, Nov. 1, 2020, vol. 140, No. 11, pp. 1198 1206, Partial Translation of Office Action Issued to JP 2022-065744.

Octave Mariotti et al: "Semi-supervised Viewpoint Estimation with Geometry-aware Conditional Generation", arxiv.org, Cornell University Library, Apr. 2, 2021, 201 Olin Library Cornell University Ithaca, NY 14853.

Olszewski Kyle et al: "Transformable Bottleneck Networks", IEEE,CVF Interantional Conference on Computer Vision (ICCV), IEEE, Oct. 27, 2019, p. 7647-7656.

Oier Mees et al: "Self-supervised 3D Shape and Viewpoint Estimation from Single Images for Robotics", Oct. 17, 2019, arxiv.org, Cornell University Library, 201 Olin Library Cornell University Ithaca NY 14853.

Siva Karthik Mustikovela et al: Self-Supervised Viewpoint Learning From Image Collections Apr. 4, 2020, arxiv.org Cornell University Library, 201 Olin Library Cornell University Ithaca, NY 14853.

Daniel E. Worrall, et al., "Interpretable Transformation with Encoder-Decoder Networks" Oct. 19, 2017, arXiv: 1710.07307v1., University College London.

Tejas D. Kulkarni, et al., "Deep Convolutional Inverse Graphics Network", Jun. 22, 2015, arXiv: 1503.03167v4.

Xun Huang, et al., "Arbitraru Style Transfer in Real-time With Adaptive Instance Normalization", Jul. 30, 2017, arXiv: 1703.06868v2.

Diederik P. Kingma and Jimmy Lei Ba, "Adam: A Method for Stochastic Optimization" Jan. 30, 2017, arXiv: 1412.6980v9.

* cited by examiner

METHOD FOR TRAINING NEURAL NETWORK, SYSTEM FOR TRAINING NEURAL NETWORK, AND NEURAL NETWORK

CROSS-REFERENCE TO RELATED APPLICATION

This application claims priority to European Patent Application No. EP21167942.8 filed on Apr. 12, 2021, incorporated herein by reference in its entirety.

BACKGROUND

1. Technical Field

The present disclosure is related to a method for training a neural network, a system for training a neural network, and a neural network.

2. Description of Related Art

It has been proposed to detect three-dimensional objects on images acquired by cameras by using neural networks implemented on computer systems. Typically, it is desirable to also obtain information relative to the 6D pose of the objects visible on an image. "6D pose" is an expression well known to the person skilled in the art which designates the combination of the three-dimensional position and of the three-dimensional orientation of an object. Obtaining the 6D pose is particularly useful in the field of robotics wherein objects are detected and manipulated. It is also useful to determine the orientation of an object in a driving scene to as to allow autonomous or partially autonomous driving.

The viewpoint of an object visible on an image is one such information relative to the 6D pose which is desirable. The viewpoint can be defined as the azimuth, the elevation, and the in-plane rotation of an object relative to the camera used to acquire the image. Neural networks have also been used to determine automatically the viewpoint of an object visible on an image.

Object viewpoint estimation is one of the key components required to enable autonomous systems to understand the three-dimensional (3D) world. Known methods in controlled environments have been observed to be successful to detect the viewpoints of objects. These known methods benefit from modern learnable representations and have been shown to help other vision tasks such as object detection and 3D reconstruction, and have been used in various applications. For example, artificial neural networks (neural networks hereinafter) have been used to detect viewpoints.

In order to obtain a neural network which performs the task of determining automatically the viewpoint of an object visible on an image, a training phase of the neural network has to be performed. This training phase is usually performed using a labelled set of training images. By labelled, what is meant is that the viewpoint of an object of interest is provided for each image of the set of training images; the provided viewpoint is called the ground truth. Training then consists in inputting the images from the training set to the neural network, comparing the output of the neural network with the corresponding ground truth, and adapting the parameters of the neural network on the basis of this comparison (for example using the well-known stochastic gradient method).

As is well known in the art, a large number of labelled training images is necessary to obtain a good training of a neural network. Large-scaled labeled datasets have been an important driving force in the advancement of the state-of-the-art in computer vision tasks. However, annotating data is expensive (i.e. time-consuming), and is not scalable to a growing body of complex visual concepts. In fact, obtaining ground truths/labels typically involves using specialized hardware, controlled environments and an operator manually aligning 3D CAD models with real-world objects.

The above methods can be designated as supervised methods. These have been extensively studied, with applications in the fields of robotics or autonomous driving. These methods can successfully deliver 3D bounding boxes surrounding detected objects.

There also exist methods which learn representations that are aware of the underlying 3D structure of objects from images ("3D-aware representations"). It has been proposed to disentangle the pose of an object from its appearance, with or without pose supervision (see for example document "Interpretable transformations with encoder-decoder networks" (Daniel E Worrall, Stephan J Garbin, Daniyar Turmukhambetov, and Gabriel J Brostow. In Proceedings of the IEEE International Conference on Computer Vision, pages 5726-5735, 2017) or document "Deep Convolutional Inverse Graphics Network" (Tejas D Kulkarni, William F Whitney, Pushmeet Kohli, and Josh Tenenbaum. In Advances in neural information processing systems, pages 2539-2547, 2015). Various solutions have been proposed. However, these still require 3D annotations in order to learn meaningful embedding. In fact, 3D rotations have been observed to cause drastic appearance changes that are too complex for networks to learn without annotations.

How to use unlabeled data remains desirable to train a neural network to perform a task such as viewpoint estimation, as unlabeled data is inexpensive and easier to obtain.

SUMMARY

The present disclosure provides a method (for example performed by a computer system) for training a first neural network to detect a viewpoint of an object visible on an image, centered (i.e. centered in this image), and belonging to a given category of object when this image is inputted to the first neural network, comprising:

providing a dataset of pairs of image, each pair of images comprising a first image on which an object belonging to said category is visible under a first viewpoint and centered (i.e. centered in the first image), and a second image on which the same object is visible under a second viewpoint which differs from the first viewpoint, and centered (i.e. centered in the second image), providing a second neural network configured to be able to deliver appearance information of an object visible on an image and belonging to said category when this image is inputted to the second neural network, providing a third neural network configured to be able to deliver a synthetic image of an object (for example centered on the object) of said category when appearance information of an object and a viewpoint are inputted to the third neural network, jointly training the first neural network, the second neural network, and the third neural network by adapting parameters of the first neural network, the second neural network, and the third neural network so as to minimize a distance between:

at least a portion of the first image of a pair of images from the dataset of pairs of image, this portion showing the object visible on the image (in its entirety), and a synthetic image delivered by the third neural network it receives as input a viewpoint delivered by inputting the first image to the first neural network and appearance information delivered by inputting the second image of the pair to the second neural network.

In the images of the dataset of pairs of images, the objects are centered. For example, the images can be the result of a cropping of another image on which the object has been detected and surrounded by a bounding box. This bounding box may also have been placed manually. The synthetic images will show objects centered as they will try, through the training, to reproduce first images.

The portion of the first image can be the result of applying a segmentation mask on the first image, wherein the segmentation mask, when applied, only keeps pixels of the object. This allows obtaining synthetic images with no background and a training which does not take the background of the first image into account. Determining the viewpoint will not be affected by the presence of a background once the training is complete.

Alternatively, if the images of the dataset of pairs of images do not have a background, the entire first image can be used when minimizing the distance. This alternative can be used when the images of the dataset have been rendered from CAD images. Determining the viewpoint of objects placed at the center of an image having a background may still be achievable in this case.

It should be noted that the first neural network operates on images centered on objects, for example images outputted by an object detector which places bounding boxes surrounding detected objects (the images may be cropped according to the bounding box).

The method therefore proposes a fully unsupervised training method. The dataset (which may also be referred to as a training dataset) can be an unlabeled dataset. The viewpoints of the objects visible on the images from this dataset are not known. Training of the first neural network can however be performed under the condition that each pair of images shows the same object (for the pair, different pairs can show different objects) but under different viewpoints. In fact, if the viewpoint detection is accurate, then the image outputted by the third neural network will be as close as possible to the original first image. The training will then strive to reduce the distance between the two images.

In the above method, it is also not necessary to know the difference between the two images, only the appearance is leveraged from the second image.

By appearance, what is meant is color, 3D shape, the texture, etc. It is the training method which will force the output of the second neural network to be the appearance, as it will be used to reconstruct an image which will be compared to another image showing the object and that without appearance, the training will not converge.

In the first stages of the training, the first, the second, and the third neural network output random information, and subsequent iterations of training will force the output of the first neural network to be a viewpoint, the output of the second neural network to include appearance information, and the output of the third neural network to be an image as explained above.

Consequently, the person skilled in the art will be able to select the dimensions of the layers of each of these so as to accommodate a viewpoint, appearance information (the size should be large enough to include the shape, the color, etc.), and an image of the same size as the images of the training dataset.

It should be noted that the first neural network is the actual neural network which will be used at testing time (to detect the viewpoints of objects), but that the two other neural networks (the second and the third neural networks) are to be used during the training phase as well as trained during the training phase.

This method may be implemented on a computing system, for example to perform the training automatically.

In the present description, viewpoint means viewpoint with respect to the camera used to acquire the image on which the object is visible.

The category of an object can be referred to as the type or the class of an object, in a manner which is usually done by the person skilled in the art in the field of object detection or semantic segmentation. By way of example, the category can be selected in a list of categories of objects typically present in a scene observed on a street. For example, the categories can be chosen in the list comprising car, pedestrian, cyclist, bus, truck, etc. Categories may also be defined more precisely (for example, for cars, it is possible to consider sedans, compact cars, etc.). For example, the object in the above method is a car and a pair of images will include two different images of the same car seen under different viewing angles.

As explained above, the images inputted to the first neural network are centered on the object for which the viewpoint is to be determined. These images can be outputted by an object detector in a preliminary step of the method (this is also true for images of the training dataset).

Jointly training the neural networks can be performed iteratively. For example each iteration can comprise inputting a first image of a pair to the first neural network and the second image of this pair to the second neural network, and calculating said distance. After each calculation of a distance, or after a plurality of distances are calculated (in the case of batch training), the stochastic gradient descent may be used or any other suitable training algorithm or variant of the stochastic gradient descent. The stochastic gradient descent can be used to adapt the parameters of the first neural network, the second neural network, and the third neural network in a manner known in itself. These parameters are, for example the weights of these neural networks. Minimizing the distance comprises calculating a loss to be minimized, and, for example, back-propagating this loss through the first neural network, the second neural network, and the third neural network.

It should be noted that the person skilled in the art will know how to select the structures of the first neural network, of the second neural network, and of the third neural network. For example, the first neural network has to be able to receive images having a given resolution as input with a depth of 3 (if it receives RGB images), and it also has to output a representation of a viewpoint (for example at least three numbers for representing the viewpoint (azimuth, elevation, in-plane rotation), or the coordinate of a point on a unit sphere), and this corresponds to given numbers of neurons for the first layer and for the final layer of this first neural network.

Also for example, the second neural network has to be able to receive images having a given resolution as input with a depth of 3 (if it receives RGB images). It also has to be able to output appearance information of an object visible on the image, and this corresponds to given numbers of neurons for the first layer of the second neural network and the final layer of the second neural network. The dimensions of this appearance information can be found in a calibration step. By way of example, the appearance information should contain enough information so that an image of the object can be elaborated under any viewpoint. If the object is a car, the appearance information should contain enough information so that the shape and the color of the car can be included.

It should be noted that the appearance information can be in a coded form. This could be the case if the second neural network has the structure of an encoder which could be used in an auto-encoder configured to process images. In an auto-encoder, the output of the encoder contains enough information in a coded manner to retrieve the original image. The third neural network if configured to deliver images, for examples images having the same resolution as the images inputted to the first and second neural network. This indicates the number of neurons of the final layer of this third neural network. This third neural network may also be configured to be able to receive, at any point in its structure, appearance information and a viewpoint.

The person skilled in the art will also know how to determine the distance between two images, for example the distance between the output of the third neural network and the second image.

Also, the above method may be able to determine automatically the viewpoints of objects from the given category, or objects from a plurality of categories. In some examples, the images used in the above method only show one object of this plurality of category per image.

According to a particular embodiment, the distance may be defined using perceptual loss.

Using the perceptual loss has been observed by the inventors to provide better results in term of the quality of images outputted by the third neural network.

According to a particular embodiment, the first neural network may be configured to deliver a plurality of viewpoint hypothesis, and wherein the viewpoint hypothesis associated with a smallest distance is used for adapting said parameters.

A known difficulty in the field of viewpoint estimation is how to deal with symmetrical objects, and known methods often produce results which can be erroneous (at + or −π for the azimuth). It has been observed that having a first neural network able to deliver multiple hypotheses can overcome this difficulty. Back propagating gradients using the best hypothesis will then train the first neural network to produce better hypothesis.

According to a particular embodiment, the first neural network may be further configured to be able to deliver an indicator configured to be able to indicate a best hypothesis.

The weights of the first neural networks which participate to elaborating this indicator will be adapted during the training. Thus, the first neural network is further trained so as to deliver this indicator.

The indicator allows using the neural network during the testing phase on symmetrical objects. The viewpoint designated by the indicator should be the viewpoint to be considered as the output of the first neural network during the testing phase.

According to a particular embodiment, the third neural network may use object conditional generating process to use the appearance information as input and/or to use the viewpoint as input.

The object conditional generating process can be the one of document "Arbitrary style transfer in real-time with adaptive instance normalization" (Xun Huang and Serge Belongie. In Proceedings of the IEEE International Conference on Computer Vision, pages 1501-1510, 2017), in other words, it can be based on adaptive instance normalization (also called "AdaIN" by the person skilled in the art). Object conditional generating processes has been observed to ensure that the appearance of the object is in fact taken into account by the third neural network when it elaborates an image. Other methods (for example using a decoder from an auto-encoder) may ignore the contribution of the appearance, by not correctly factorizing the appearance. Because object conditional generating processes can adapt the generation process (i.e. of the image) at different scales, the possibility to ignore the appearance is mitigated.

Similarly, the viewpoint can be used in a later stage of the image generation process so as to ensure that it is taken into account to generate the image and so as to avoid a situation where the viewpoint information is overlooked.

According to a particular embodiment, the third neural network may be configured to further receive a generic code as input, and comprises a plurality of consecutive 3D convolutional layers configured to receive the generic code as input, wherein the output of each 3D convolutional layer is configured to be transformed by a given affine transformation using the appearance information used as input to the third neural network as a parameter so as to obtain a transformed output, and wherein the third neural network comprises a rendering module configured to receive as input the transformed output of the final 3D convolutional layer and the viewpoint used as input to the third neural network.

The transformed output can be a volume, and this is a result of using 3D convolutional layers.

In the above embodiment, the generic code can be, for example, a code chosen randomly (for example a random 1D vector having a size chosen empirically). After the training process, the generic code will be affected meaning as it will encode an average object in a canonical pose. The generic code should be fixed during the entire training phase.

Also, the consecutive 3D convolutional layers can have a resolution which increases after each application of an affine transformation.

The affine transformations implement the object conditional generative process.

Also, in the third neural network, the viewpoint is taken into account in the final rendering step. This ensures that the back-propagation of gradients propagate to the first neural network, and guarantees that viewpoint errors cannot be compensated by convolutional layers.

According to a particular embodiment, the rendering module may include a rotation module configured to perform a rotation on the transformed output received by the rendering module in accordance with the viewpoint used as input to the third neural network, and configured to output a rotated output, a perspective module configured to apply a perspective on the rotated output, and a ray-tracing module configured to elaborate the image outputted by the third neural network and to use the rotated output on which the perspective has been applied.

The above defined rendering module enforces geometric consistency during the generation process (the operation of the third neural network), between the above mentioned volume (the transformed output) and the final elaborated image.

According to a particular embodiment, the ray-tracing module may be configured to:
elaborate a probability map indicating probability of a ray of a pixel to stop at a depth,
obtain an occupancy map from the probability map, elaborate the image from the occupancy map and the rotated output on which the perspective has been applied.

According to a particular embodiment, the method may further include an additional training comprising at least:

determining a random viewpoint, selecting a random image from the dataset, inputting the random image to the second neural network to obtain appearance information, delivering an additional synthetic image by inputting the random viewpoint and the appearance information of the random image to the third neural network, and minimizing the distance between the random viewpoint and the output of the first neural network when the additional synthetic image is inputted to the first neural network (for example by performing a backpropagation of error through the first neural network).

This specific embodiment ensures that the viewpoint is indeed taken into account during the training, and prevents correlations between images from having an impact.

This embodiment uses the fact that the above method can generate images from random views, and improves the training of the first neural network is the training dataset is limited.

This training can be iterative, and the iterations can be performed after the joint training has been performed or in a parallel manner.

The disclosure further provides a neural network trained by the method as defined above as a first neural network.

This neural network may be stored on an electronic support, for example in a non-volatile memory.

The disclosure also provides a system for training a first neural network to detect a viewpoint of an object visible and centered on an image and belonging to a given category of object when this image is inputted to the first neural network, comprising:

a dataset of pairs of image, each pair of images comprising a first image on which an object belonging to said category is visible under a first viewpoint and centered, and a second image on which the same object is visible under a second viewpoint which differs from the first viewpoint and centered, a second neural network configured to be able to deliver appearance information of an object visible on an image and belonging to said category when this image is inputted to the second neural network, a third neural network configured to be able to deliver a synthetic image of an object of said category when appearance information of an object and a viewpoint are inputted to the third neural network, a training module configured to jointly train the first neural network, the second neural network, and the third neural network by adapting parameters of the first neural network, the second neural network, and the third neural network so as to minimize a distance between:

at least a portion of the first image of a pair of images from the dataset of pairs of image, this portion showing the object visible on the image, and a synthetic image delivered by the third neural network it receives as input a viewpoint delivered by inputting the first image to the first neural network and appearance information delivered by inputting the second image of the pair to the second neural network.

This system may be configured to perform any embodiment of the above defined method.

The disclosure also provides a system as defined above as being the first one from the above training method, stored on a support, and a camera. The disclosure also provides a vehicle including this system.

In one particular embodiment, the steps of the method are determined by computer program instructions.

Consequently, the disclosure is also directed to a computer program for executing the steps of the method as described above when this program is executed by a computer.

This program can use any programming language and take the form of source code, object code or a code intermediate between source code and object code, such as a partially compiled form, or any other desirable form.

The disclosure is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An exemplary method for training a neural network to deliver the viewpoint of a given object visible on an image will now be described.

The viewpoint of an object can be defined as the combination of the azimuth angle of the object with respect to a camera, the elevation of the object, and the in-plane rotation of the object (Euler angles). The viewpoint may also be defined as a rotation matrix $R \in SO_3$.

Figure 1:
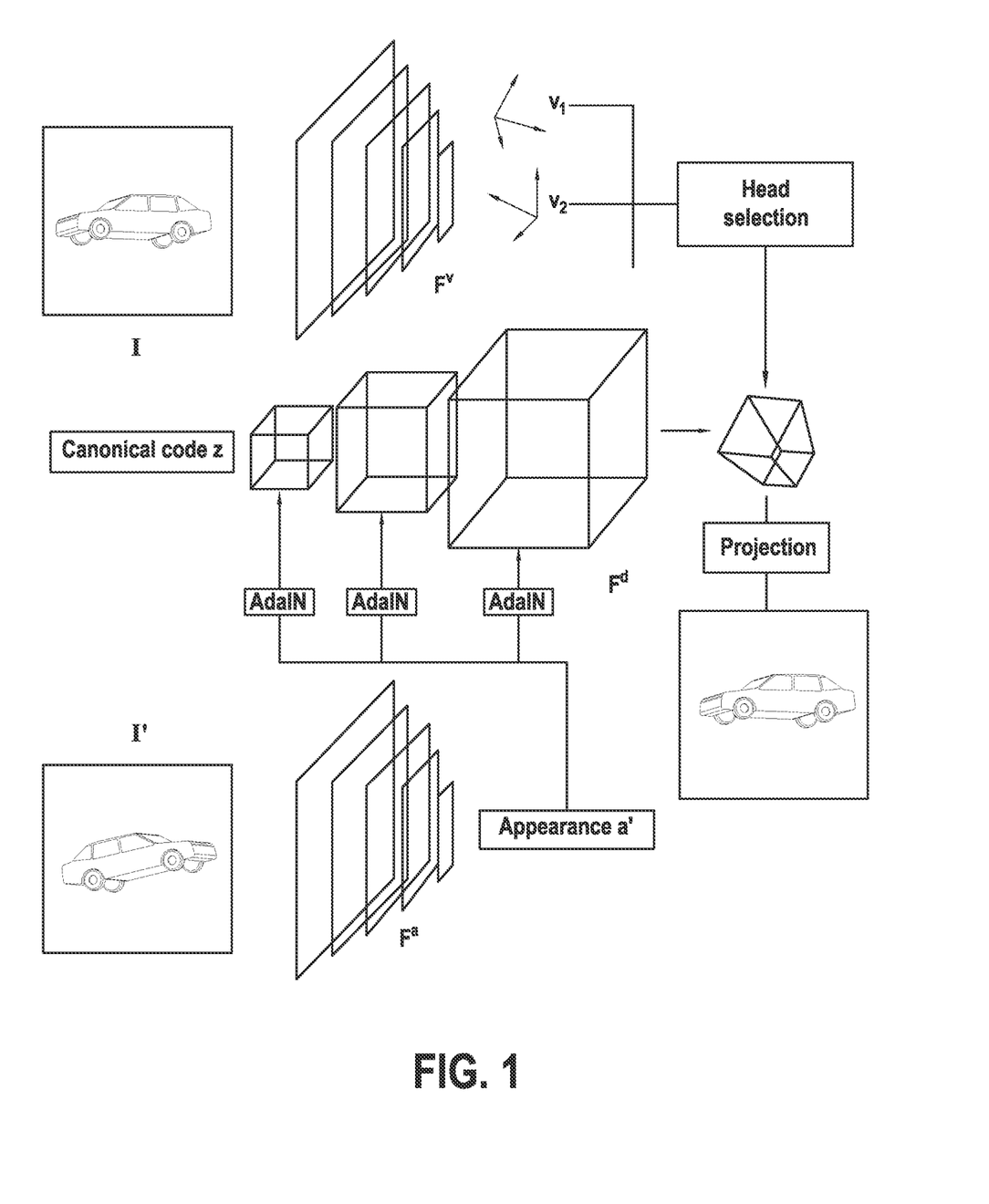
FIG. 1 is a schematic representation of training method.

FIG. 1 is a schematic representation of a method for training a neural network so that this neural network can detect the viewpoint of objects visible on images which are inputted to this neural network. On the figure, this neural network (as well as the corresponding function implemented by this neural network) is designated as $f^v$. Also, and as additional neural networks will be used during the training of $f^v$, $f^v$ will also be referred to as the first neural network.

$f^v$ operates on the image space I to output viewpoints in the pose/viewpoints space $V: f^v: I \rightarrow V$. This operation is for objects having a given category of objects. Thus, $f^v$ performs the operation of object detection but outputs the viewpoint of the detected object.

Because it is difficult to obtain a training dataset comprising images of objects and the corresponding viewpoints (ground truths), it is proposed to perform a self-supervised training which uses principles from conditional generation and analysis by synthesis (approaches that try to understand visual information by reconstructing input images). To this end, it is proposed to factorize the viewpoint and the appearance of objects visible on images via two functions implemented by neural networks: the above mentioned function $f^v$ and a second one $f^a$, the second neural network in the present description. Indeed, $f^a$ is configured to be able to receive an image as input and to output appearance information a of the object visible on an image processed by $f^a$, while $f^v$ outputs viewpoints v.

In the present application, appearance information can include color, 3D shape, the texture, etc. Also, the appearance information can be presented in a coded form.

In order to elaborate an object which will allow a comparison to be performed so as to verify that a viewpoint estimation is accurate, a third neural network $f^d$ is provided. The third neural network is configured to be able to reconstruct a synthetic image I showing an object, given the viewpoint v of this object (which should be the viewpoint under which the object should be seen on the reconstructed image) and the appearance a of this object (the object should have an appearance which corresponds to a on the reconstructed image).

The three neural networks $f^v$, $f^a$, and $f^d$ have parameters (or weights) respectively denoted $\theta^v$, $\theta^a$, and $\theta^d$. These parameters will be adapted during the training with the goal of ensuring that $f^v$ delivers an accurate viewpoint estimation, without using annotated images indicating the viewpoint of objects. To this end, a training dataset T comprising pairs of images is provided. T is defined as:

$$T=\{(I_i,I'_i)\}_{i=1}^N,$$

Wherein $(I_i,I'_i)$ designates a pair of images of index i in the dataset T comprising N pairs of images. In a pair of images $(I_i,I'_i)$, both $I_i$ and $I'_i$ show a same object (for example the same car) but under different viewpoints, respectively $v_i$ and $v'_i$. The objects are centered in the images $(I_i,I'_i)$, and these images may have a background or no background (for example they only show the object). For example, the images $(I_i,I'_i)$ can be obtained using an object detector on frames of a video showing the object under different viewpoint (in this case they have a background), or they can be generated from a CAD model (in this case they may not have a background).

The present method proposes to jointly train the first neural network $f^v$, the second neural network $f^a$, and the third neural network $f^d$ by adapting the parameters of the first neural network, the second neural network, and the third neural network so as to minimize the distance between:
a first image I of a pair of images from the dataset of pairs of image, and
a synthetic image delivered by the third neural network it receives as input a viewpoint delivered by inputting the first image I to the first neural network and appearance information delivered by inputting the second image I' of the pair to the second neural network.

In other words, the following optimization is performed:

$$\min_{\theta^v,\theta^a,\theta^d} \sum_{I,I' \in T} \|f^d(f^a(I'), f^v(I)) - I\|$$

The above equation can be used if the images $(I_i,I'_i)$ do not have backgrounds. If they have a background, I in the right term of the difference may be replaced by by M(I), the result of the application of a segmentation mask to I, this segmentation mask delimiting the pixels which show the object.

In more detail, it should be noted that $f^v$ can have a structure comprising 7 convolutional layers interleaved with batch normalization and ReLU activation functions. $f^v$ can be configured to receive RGB images having a resolution of 64×64. The disclosure is however not limited to this structure and this resolution, and the person skilled in the art will be able to elaborate other neural network structures for $f^v$.

Also, $f^v$ is configured to output a viewpoint $v \in S^2$, i.e. a point on a unit sphere. Each point on the sphere can be uniquely mapped to a viewpoint.

The viewpoint v may be expressed as a rotation matrix in the training stage, so as to be usable by the third neural network $f^d$ as will be explained hereinafter.

In order to obtain a viewpoint expressed as a rotation matrix, an orthogonalization operation is performed on the output of $f^v$. First, a vector u is arbitrarily chosen as representing the upwards direction, two successive cross product are performed: w=v×u and u'=w×v, the results are normalized, and the rotation matrix R is defined as [v,w,u'].

The module which performs the steps to obtain R can be learnable (differentiable), and it is also possible to learn u jointly with v.

While it is possible to use a first neural network $f^v$ configured to output only one viewpoint estimation, in embodiments, a first neural network $f^v$ may be used configured to output a plurality of viewpoint estimations. In fact, the main pitfall of unsupervised viewpoint estimation is the collapse of predictions caused by symmetries. While most systems work fine on heavily simplified objects, like a cube with each face colored differently, real world objects tend to have at least one if not many symmetric viewpoint pairs. Two viewpoints v,v' are considered to form a symmetric pair v~v' if the image produced by observing the object from v is close to that produced by observing it from v'. For example, for most cars, (a,e,t)~(a+π,e,t) form a symmetric pair for any azimuth a, elevation e, and camera tilt t. Thus, unsupervised methods based on reconstruction typically equate those two viewpoints, leading to a collapse of the predictions. Different workarounds have been proposed to mitigate this, such as using an adversarial model to enforce a prior on the pose distribution, using several prediction heads, or enforcing some symmetric consistency in predictions using a flipped version of the image. These solutions are not satisfactory. For example, using flipped versions of the image assumes that semantics are preserved when flipping the image (which assumes prior knowledge of the object), it that it is only valid for a left-right planar symmetry: this known approach can fail on the above mentioned symmetric pairs obtained for cars. Outputting multiple (for example M) viewpoints hypotheses overcomes this difficulty. For example, the two hypotheses for an object having symmetries will be respectively outputted by $f^v$ simultaneously, and determining the correct one can be performed by selecting the one which provides the smallest reconstruction error. For example, the correct viewpoint v* can be defined as:

$$v^* = f_m^{v*}(v)$$

such that $$m^* = \arg\min_{m \in M} \|f^d(f^a(I'), f_m^v(I)) - I\|$$

Wherein $f_m^v$ denotes the m-th hypothesis and M is the total number of hypothesis (for example equal to 3). It should be noted that gradients should only be propagated through the output of $f^v$ of index m so as to separate symmetric hypotheses.

It should be noted that during the testing phase (when $f^v$ will be used on actual images to detect the viewpoints of objects), having multiple hypotheses may not be convenient or expensive. To overcome this difficulty, it is proposed to implement, through f', obtaining an indicator which will be trained to indicate the best hypothesis among the multiple hypotheses outputted by f'.

This indicator may be referred to as a student output.

Keeping the multiple hypotheses during the testing phase has been observed to be more robust.

Concerning the second neural network $f^a$, it should be noted that $f^a$ can have a structure comprising 7 convolutional layers interleaved with batch normalization and ReLU activation functions. $f^a$ can be configured to receive RGB images having a resolution of 64×64. The disclosure is however not limited to this structure and this resolution, and the person skilled in the art will be able to elaborate other neural network structures for $f^a$.

The operation of $f^a$ is $f^a(I')=a' \in \mathbb{R}^n$ (n is selected empirically, for example set at 128, 256, or even 1024, so as to ensure that the system operates without too much overhead), and $f^a$ has the structure of an encoder which could be a portion of an auto-encoder.

While $f^d$ could have the structure of a decoder of an auto-encoder, an advantageous structure will now be described. In fact, an auto-encoder structure has been observed to offer no guarantee that the appearance and the viewpoint, when inputted to the decoder, are correctly factorized. For example, the viewpoint v' of the object on image I' can be included in a', which means that a change in v' could induce changes in the appearance of the reconstruction. In extreme cases, the network could even ignore v and reconstruct I by memorizing the (I,I') pairs. To mitigate this, an object conditional process, here based on adaptive instance normalization (as described in document "Arbitrary style transfer in real-time with adaptive instance normalization") is used. While this approach has been initially used for style transfer, this approach is also popular in GANs due to its ability to adapt the generation process at different scales.

In a preliminary step, a random static code $z \in \mathbb{R}^n$ (m is selected empirically, for example set at 1024 in embodiments, m>n so that the network cannot encode everything in the output of $f^a$, thus needing to rely on z to encode the global information about the object category) is defined so as to form the main input of $f^d$. z can be randomly picked from a normal distribution of 1D vectors and aims at encoding the average object from the dataset at the end of the training phase, and remains constant/fixed in the entire training phase. The purpose of z is to encode an average object in a canonical pose after the training.

z is inputted to $f^d$, and more precisely to a first 3D convolutional layer, the output of this layer is transformed by an affine transformation which uses a' as parameter for the transformation (this step is designated on FIG. 1 as AdaIN). A plurality of such 3D convolutional layers followed by an affine transformation is implemented (and also by a ReLU). By way of example, 7 such 3D convolutional layers and transformations are used, and the resolutions of these 3D convolutional layers increases one after the other.

It should be noted that a' is applied through the transformation at different depths, uniformly over each feature channel, and that this will influence the reconstruction better.

Also, at this stage, the viewpoint v obtained from $f^v$ has not yet been used by $f^d$.

After the last transformation, a transformed output is obtained. This transformed output is then used in a rendering module which receives as input the transformed output and the viewpoint v obtained from $f^v$.

The transformed output can have, for example, a pluridimensionnal structure able to store the RGB values, an occupancy grid, and spatial coordinates (X, Y, and Z). For example, the transformed output can be a tensor.

Figure 2:
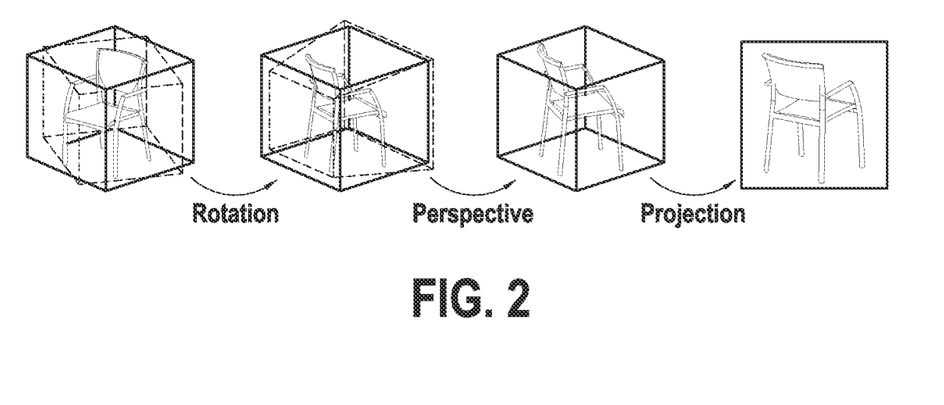
FIG. 2 is a schematic representation of the operation of the training module.

In a first module of the rendering module, the transformed output, which defines a volume V, is rotated using the matrix R defined above as parameter, to obtain a rotated output. A new volume is then obtained by resampling the data along the rotated axis.

Then, a perspective is applied on the rotated output. Because the single point perspective of a pinhole camera will have the effect of decreasing the apparent size of the object proportionally to the distance, this perspective application can comprise a dilatation of close points in the volume and a contraction of the distant points of the volume.

A pseudo ray-tracing module is then used so as to project the volume on a 2D plane.

FIG. 2 shows graphically the operation of the rendering module.

Parts of the object will be subject to self-occlusion, which allows using a pseudo ray-tracing module to compute which parts will appear in the final reconstruction, ensuring a proper geometric consistency.

The volume V obtained after the rotation and the perspective application has four channels, the first three represent the RGB components and the fourth one is the occupancy map, containing information about the shape of the object. The value of each cell is interpreted as the probability of the object occupying the corresponding spatial location. To compute the projection, where each light ray is likely to stop should be estimated. Since the perspective is already accounted for, all the rays are parallel, leaving only the depth of each stopping point to be computed. It should be noted that it is not necessary to compute a path for each light ray: this path is embedded in the shape of the volume. All light paths can be computed simultaneously using parallel operations. The probability of the light ray at pixel coordinates i;j to stop at depth k is given by:

$$Q'_{i,j,k} = Q_{i,j,k} \times \prod_{l=0}^{k-1}(1 - Q_{i,j,l})$$

with the convention that an empty product is equal to 1.

The first term $Q_{i,j,k}$ represents the probability of the voxel at coordinates (i,j,k) being occupied, while the second one $\prod_{l=0}^{k-1}(1-Q_{i,j,l})$ is the probability of all the previous ones being invisible. Hence, the final image will have the following pixel value at coordinates i;j:

$$\hat{I}_{i,j} = \sum_{k=1}^{n}\left[C_{i,j,k} \times Q_{i,j,k} \times \prod_{l=0}^{k-1}(1 - Q_{i,j,l})\right]$$

While the supervision could be provided using only a segmentation mask, where the system knows whether the light ray passes through the whole volume or stops at some point, another approach is used in embodiments. It is proposed to use direct pixel values for supervision, which means that the information concerning the light ray passing or stopping is not provided as all light rays seem to stop at some point. Thus, a strong failure mode of the present method comprises using the volume V as a canvas and "painting" the object in different poses on the sides. This can cause errors in the shape of the object, because there is no knowledge of which pixels belong to the object. To overcome this issue, a reparametrization of the occupancy grid is performed. Instead of learning Q, Q' is learned such that Q=Q'+S where S is a three dimensional Gaussian distribution centered on V. Essentially, learning Q' comprises learning a residual over S, that is deforming S to match the shape of the observed object. This sets a prior for the shape and position of the object, while discouraging the network from using voxels that are away from the center.

Additionally, setting the supervision in image space (i.e. comparing to pixel values instead of a mere segmentation mask) provides the benefit or allowing to generate new views. In particular, those views can be used during training to help refine the predictions: it is possible to randomly sample the viewpoint space $\tilde{v} \sim U(V)$ and render new images $\tilde{I}=f^d(\tilde{v},a')$ using appearance information a'. Then, is possible to feed those images in the pose estimator and to set $\tilde{v}$ as target $L_{cycle}=\|f^v(\tilde{I})-\tilde{v}\|$ ($L_{cycle}$ is the squared distance between the output of $f^v$ on $\tilde{I}$ and $\tilde{v}$). This allows generalizing beyond the set of poses present in the training set of poses present in the training set, and the newly created samples help regularizing the pose network.

Additional parameters may be added to the rendering process such as the distance between object and camera, implemented by a scaling factor, or lighting, implemented by another rotation and ray-tracing operation to illuminate parts of the object.

The training can be performed by batches of 64 samples, and optimization can be performed using the Adam optimizer (see document "Adam: A method for stochastic optimization" (Diederik P Kingma and Jimmy Ba. arXiv preprint arXiv:1412.6980, 2014)).

Figure 3:
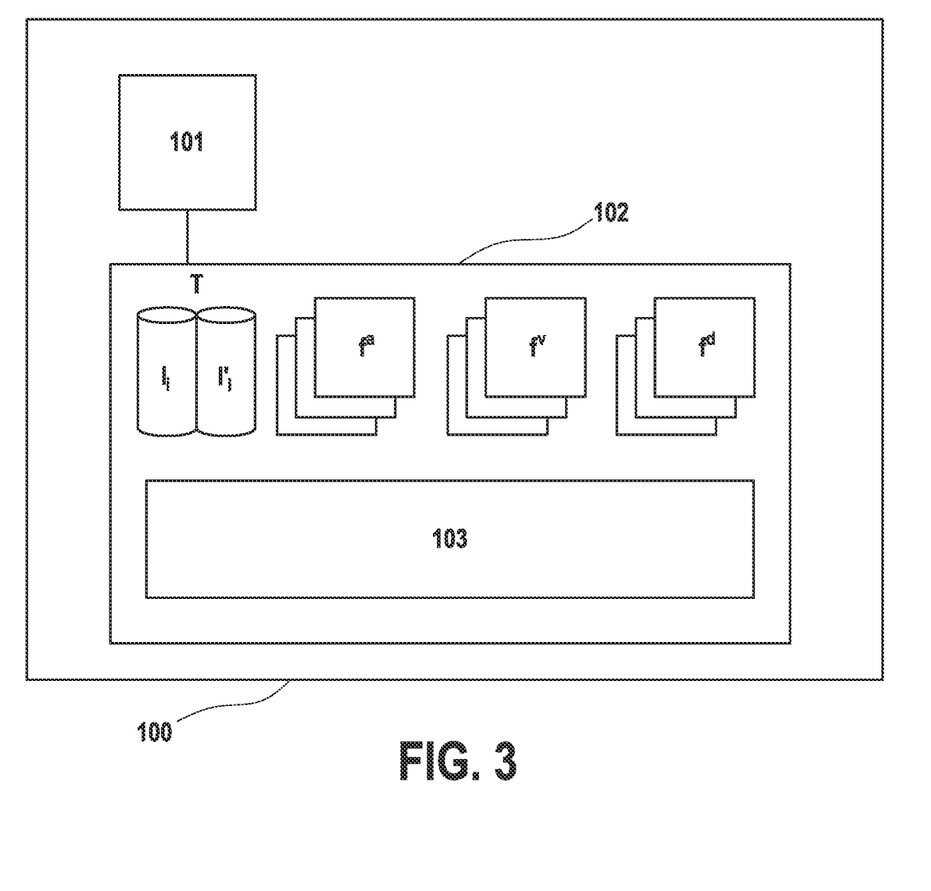
FIG. 3 is a schematic representation of a system according to an example.

FIG. 3 shows a system 100 for training the above defined first neural network $f^v$. This system comprises a processor 101 and has the structure of a computer system.

It also comprises a nonvolatile memory 102 on which the three neural networks $f^v$, $f^a$, and $f^d$ are stored, as well as the training dataset T. Computer program instructions 103 for performing the training are also stored in the nonvolatile memory 102. The computer program instructions 103 and the processor 101 form a training module configured to jointly train the first neural network, the second neural network, and the third neural network by adapting the parameters of the first neural network, the second neural network, and the third neural network so as to minimize the distance between:

a first image of a pair of images from the dataset of pairs of image, and a synthetic image delivered by the third neural network it receives as input a viewpoint delivered by inputting the first image to the first neural network and appearance information delivered by inputting the second image of the pair to the second neural network.

Figure 4:
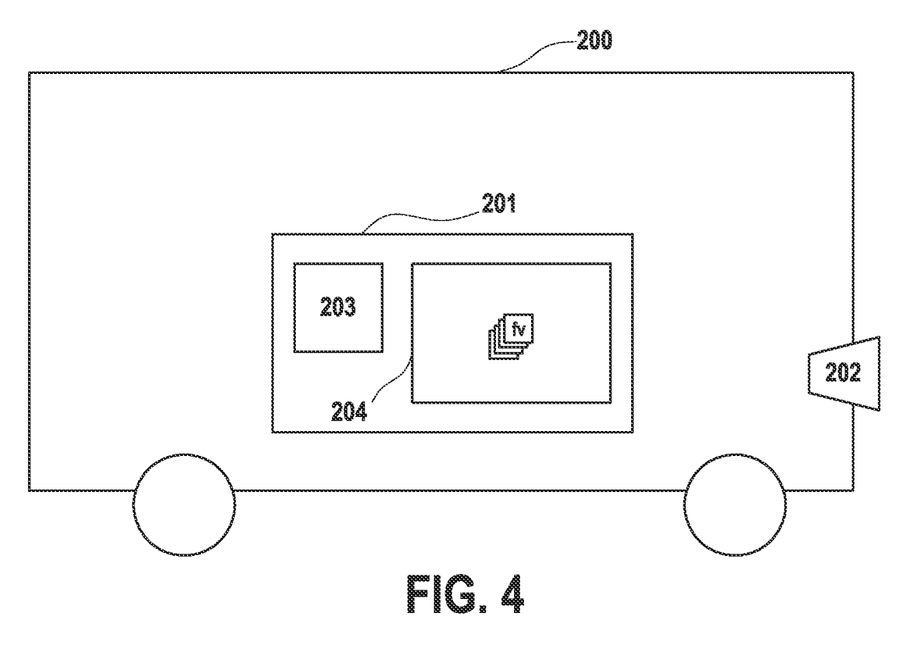
FIG. 4 is a vehicle according to an example.

FIG. 4 is a schematic representation of a vehicle 200, here a car, equipped with a system 201 for determining the viewpoints of objects visible on images acquired by a camera 202 of the vehicle.

The system 201 comprises a processor 203 and a nonvolatile memory 204 in which the neural network $f^v$ is stored after the training as defined above has been performed.

The above-described training allows obtaining neural networks which have been observed to perform better at detecting viewpoints than neural networks simply trained using a labelled set of training images (supervised training).

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

What is claimed is:

1. A method for training a first neural network to detect a viewpoint of an object visible on an image, centered, and belonging to a given category of object when this image is inputted to the first neural network, comprising:
   providing a dataset of pairs of images, each pair of images comprising a first image on which an object belonging to said category is visible under a first viewpoint and centered, and a second image on which the same object is visible under a second viewpoint which differs from the first viewpoint, and centered,
   providing a second neural network configured to be able to deliver appearance information of an object visible on an image and belonging to said category when this image is inputted to the second neural network,
   providing a third neural network configured to be able to deliver a synthetic image of an object of said category when appearance information of an object and a viewpoint are inputted to the third neural network,
   jointly training the first neural network, the second neural network, and the third neural network by adapting parameters of the first neural network, the second neural network, and the third neural network so as to minimize a distance between:
   at least a portion of the first image of a pair of images from the dataset of pairs of image, this portion showing the object visible on the image, and
   a synthetic image delivered by the third neural network after it receives as input a viewpoint delivered by the first neural network after inputting the first image to the first neural network and appearance information delivered by the second neural network after inputting the second image of the pair to the second neural network.

2. The method according to claim 1, wherein the distance is defined using perceptual loss.

3. The method according to claim 1, wherein the first neural network is configured to deliver a plurality of viewpoint hypothesis, and wherein the viewpoint hypothesis associated with a smallest distance is used for adapting said parameters.

4. The method according to claim 3, wherein the first neural network is further configured to be able to deliver an indicator configured to be able to indicate a best hypothesis.

5. The method according to claim 1, wherein the third neural network uses object conditional generating process to use the appearance information as input and/or to use the viewpoint as input.

6. The method according to claim 5, wherein the third neural network is configured to further receive a generic code as input, and comprises a plurality of consecutive three-dimensional convolutional layers configured to receive the generic code as input, wherein an output of each three-dimensional convolutional layer is configured to be transformed by a given affine transformation using the appearance information used as input to the third neural network as a parameter so as to obtain a transformed output, and wherein the third neural network comprises a rendering module configured to receive as input the transformed output of a final three-dimensional convolutional layer and the viewpoint used as input to the third neural network.

7. The method according to claim 6, wherein the rendering module includes a rotation module configured to perform a rotation on the transformed output received by the rendering module in accordance with the viewpoint used as input to the third neural network, and configured to output a rotated output,
a perspective module configured to apply a perspective on the rotated output, and
a ray-tracing module configured to elaborate the image outputted by the third neural network and to use the rotated output on which the perspective has been applied.

8. The method according to claim 7, wherein the ray-tracing module is configured to:
elaborate a probability map indicating probability of a ray of a pixel to stop at a depth,
obtain an occupancy map from the probability map, and
elaborate the image from the occupancy map and the rotated output on which the perspective has been applied.

9. The method according to claim 1, wherein the method further includes an additional training comprising at least:
determining a random viewpoint,
selecting a random image from the dataset,
inputting the random image to the second neural network to obtain appearance information,
delivering an additional synthetic image by inputting the random viewpoint and the appearance information of the random image to the third neural network, and
minimizing the distance between the random viewpoint and the output of the first neural network when the additional synthetic image is inputted to the first neural network.

10. A system for training a first neural network to detect a viewpoint of an object visible and centered on an image and belonging to a given category of object when this image is inputted to the first neural network, comprising:
a dataset of pairs of images, each pair of images comprising a first image on which an object belonging to said category is visible under a first viewpoint and centered, and a second image on which the same object is visible under a second viewpoint which differs from the first viewpoint and centered,
a second neural network configured to be able to deliver appearance information of an object visible on an image and belonging to said category when this image is inputted to the second neural network,
a third neural network configured to be able to deliver a synthetic image of an object of said category when appearance information of an object and a viewpoint are inputted to the third neural network,
a training module configured to jointly train the first neural network, the second neural network, and the third neural network by adapting parameters of the first neural network, the second neural network, and the third neural network so as to minimize a distance between:
at least a portion of the first image of a pair of images from the dataset of pairs of image, this portion showing the object visible on the image, and
a synthetic image delivered by the third neural network after it receives as input a viewpoint delivered by the first neural network after inputting the first image to the first neural network and appearance information delivered by the second neural network after inputting the second image of the pair to the second neural network.

11. A system comprising the neural network according to claim 1 stored on a support and a camera.

12. A vehicle comprising the system according to claim 11.

13. A non-transitory recording medium readable by a computer and having recorded thereon a computer program including instructions for executing the steps of the method according to claim 1.

* * * * *